(12) United States Patent
Catoe et al.

(10) Patent No.: US 9,563,886 B1
(45) Date of Patent: Feb. 7, 2017

(54) SYSTEMS AND METHODS FOR AN IMPROVED SELF-CHECKOUT WITH SPEED TENDER TRANSACTION OPTIONS

(71) Applicants: Peter Terry Catoe, Blowing Rock, NC (US); Burt Aycock, Vilas, NC (US)

(72) Inventors: Peter Terry Catoe, Blowing Rock, NC (US); Burt Aycock, Vilas, NC (US)

(73) Assignee: ECR Software Corporation, Boone, NC (US)

( * ) Notice: Subject to any disclaimer, the term of this patent is extended or adjusted under 35 U.S.C. 154(b) by 765 days.

(21) Appl. No.: 13/869,727

(22) Filed: Apr. 24, 2013

Related U.S. Application Data (60) Provisional application No. 61/637,356, filed on Apr. 24, 2012.

(51) Int. Cl.
 G06K 5/00 (2006.01)
 G06K 15/00 (2006.01)
 G06Q 20/20 (2012.01)

(52) U.S. Cl.
 CPC .................. G06Q 20/208 (2013.01)

(58) Field of Classification Search
 CPC .................. G06K 5/00; G06K 15/00
 USPC .. 705/23, 24, 26.1, 26.41, 27.1, 27.2; 463/1, 36; 700/232; 709/203, 223; 713/186; 235/382, 383
 See application file for complete search history.

(56) References Cited

U.S. PATENT DOCUMENTS

| | | | | |
|---|---|---|---|---|
| 7,657,465 | B2 * | 2/2010 | Freishtat | G06Q 30/06 705/26.41 |
| 8,478,371 | B2 * | 7/2013 | Coggill | G06F 3/0488 455/553.1 |
| 8,483,871 | B2 * | 7/2013 | Kropp | G06Q 10/00 700/232 |
| 8,535,130 | B2 * | 9/2013 | Ciarrocchi | A63F 13/08 463/1 |
| 8,545,322 | B2 * | 10/2013 | George | G06F 3/041 463/36 |
| 8,579,685 | B2 * | 11/2013 | Ciarrocchi | A63F 13/08 463/1 |
| 8,688,839 | B2 * | 4/2014 | Subramanian | H04L 63/10 709/223 |
| 8,825,223 | B2 * | 9/2014 | Carney | H04L 9/3239 701/2 |
| 9,129,177 | B2 * | 9/2015 | Baik | G06K 9/18 |
| 2012/0166810 | A1 * | 6/2012 | Tao | G06F 21/32 713/186 |
| 2014/0063055 | A1 * | 3/2014 | Osterhout | G06F 3/005 345/633 |

* cited by examiner

*Primary Examiner* — Andrew Joseph Rudy
(74) *Attorney, Agent, or Firm* — MacCord Mason PLLC (57) ABSTRACT

A checkout apparatus including a self-checkout unit having a product identification device, a payment identification device, a microprocessor and a point-of-sale system configured to allow a touchless speed tender transaction. The invention also includes an apparatus and method for offering a mode-driven and/or customer-driven checkout transaction.

11 Claims, 5 Drawing Sheets

SYSTEMS AND METHODS FOR AN IMPROVED SELF-CHECKOUT WITH SPEED TENDER TRANSACTION OPTIONS

FIELD OF TECHNOLOGY

The present invention relates generally to systems and methods for automated self-checkouts, and more particularly to unattended self-checkout systems and methods including speed tender options.

BACKGROUND

In a retail type environment, the efficiency with which consumers are able to process, pay for and purchase their desired items factors into the expenses for a retail type establishment. The labor hours attributable to manning checkout counters contributes greatly to this expense. In a typical retail operation, a shopper gathers the items desired for purchase and presents them at a checkout counter, a clerk then scans or enters the items' barcodes and the point-of-sale (POS) system totals the shopper's bill. The clerk may apply any promotional discounts to the bill, the shopper tenders payment, and the items may be bagged for the customer. A number of self-service automated checkout terminal concepts have been developed in an attempt to reduce the need for a check-out clerk, thus reducing associated labor costs.

Toward reducing operating expenses, some businesses have implemented self-checkout counters that substitute for individual clerks and baggers at each checkout terminal. Self-checkout terminals are systems which are operated mainly by a customer without the direct aid of a checkout clerk. In such a system, the customer scans, selects or enters individual items for purchase, for example, across a scanner or screen and then places the selected items into a grocery type bag, if desired. The customer then pays for his or her purchase either at the self-service checkout terminal or at a central payment area. Thus, a self-service checkout terminal permits a customer to select, itemize and even pay for his or her purchases without the direct assistance of the retailer's personnel at each individual checkout terminal.

Self-checkout systems are also useful in other types of unattended environments, such as, employee break rooms, hotel vending areas, business lobby settings or hospitals. One of the many benefits of self-checkout systems is that they allow quick consumer-operated transactions, resulting in high throughput. This high throughput has to be balanced with a transaction that allows new self-checkout users to feel in control of and comfortable with the transaction. Some self-checkout users quickly adapt and become comfortable with a self-checkout transaction and prefer to move as quickly as possible through the transaction while others, such as new users, still need guidance through the transaction. It is to these and other problems that this disclosure is directed.

SUMMARY

As self-checkouts become more prevalent and customary for point-of-sale transactions, a mixture of proficient and new users will be involved in transactions at the same kiosk. Applicant realizes it is desirable to accommodate proficient, power users of an unattended kiosk but not at the expense of alienating more timid users. Less confident and new users usually like to press the buttons on the touch screen to tell the system what task they are performing throughout the course of their transaction. However, power users typically do not want or need this, and would prefer not to have to touch the screen at all.

Developing a speed tender option also allows health minded consumers to proceed through a transaction without the necessity of touching buttons or the screen repeatedly in order to check-out. This allows the benefit of the user not being exposed to germs that may accumulate at a station where there is high turn-over of customers touching the same touch screen or buttons.

Minimizing the necessity to move through the transaction in a touch-less fashion also reduces the wear on the touch screen, thus, extending the life of the touch screen and the associated parts. This produces an economic savings and an eco-friendly result.

These and other aspects of the present invention will become apparent to those skilled in the art after a reading of the following description of the preferred embodiment when considered with the drawings.

DESCRIPTION OF THE EXEMPLARY EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
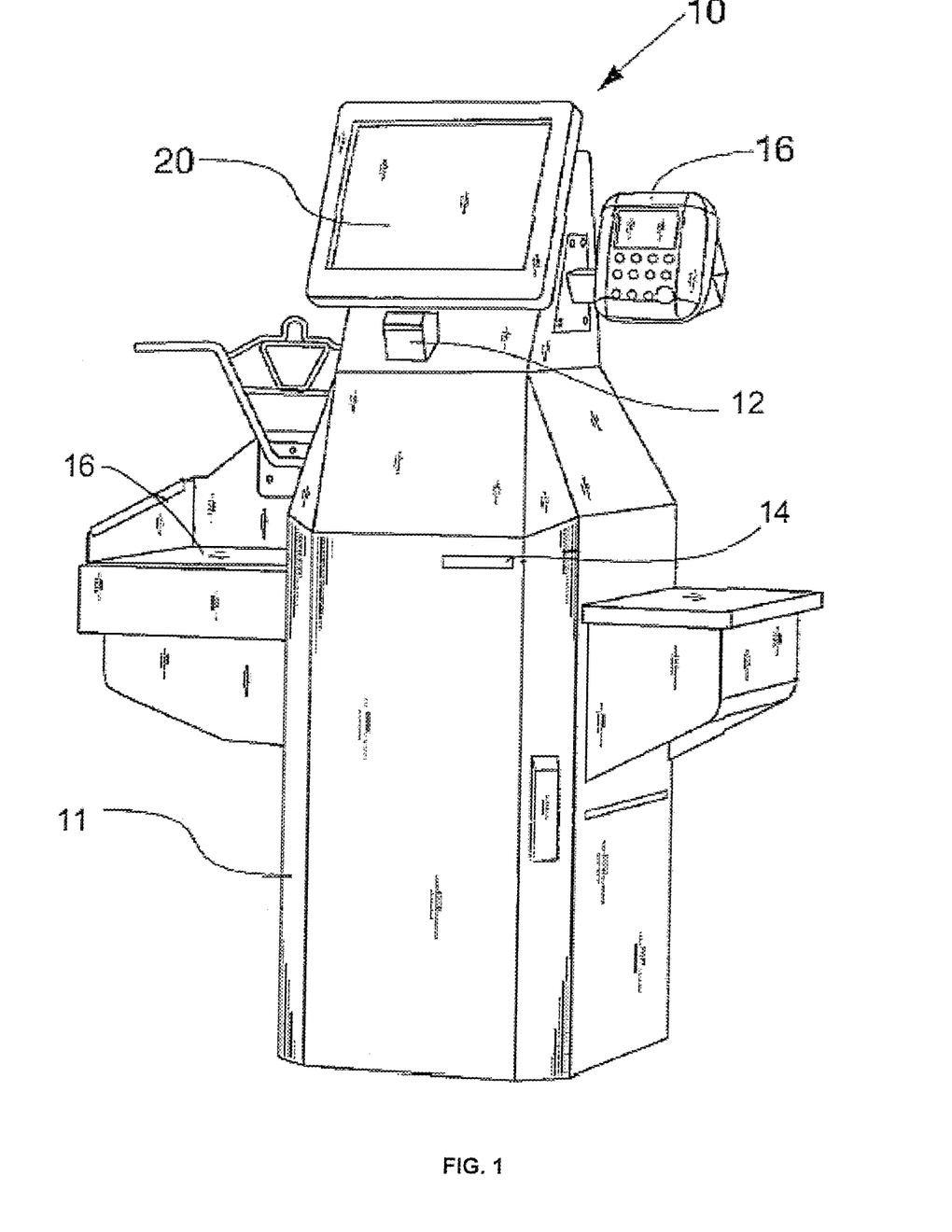
FIG. 1 is a front perspective view of one example of an improved self-checkout system according to the present disclosure.

It will be understood that the illustrations are for the purpose of describing an exemplary embodiment of the invention and are not intended to limit the invention thereto. As best seen in FIG. 1, generally designated 10, one example of an automated self-checkout system is shown. Typically, self-checkout systems include at least one kiosk. The kiosk usually includes a housing 11, typically of compact design, which accommodates or houses the other aspects of the self-checkout system. The housing 11 may be a pre-existing structure at the installation site of the self-checkout system, may resemble the housing as shown in FIG. 1, or may take on other shapes able to accommodate the other aspects of the invention.

The kiosk may also include input modules 12, output modules 14 and transaction modules 16. The input module 12, as seen in FIG. 1 may be, for example, a coupon-in center, credit/debit card reader, or a payment center. The input module 12 may typically be supported on, integral to, or attached to the housing 11. Input module 12 is arranged to accept input about or for the transaction, for example, from items being purchased by recognizing the item, such as through selection on the display 20 by the customer or by recognition of an identification or code. A bar code scanner would be another example of an input module 12 suitably found in the kiosk. Other examples, inter alia, may include one or more keypads to key in information, RFID reader, a microphone potentially with voice recognition software, a touch screen keypad, a video camera, tablet computer, wireless communication receiver, a credit card reader, a debit card reader, a smart card reader, a cash receiver a wireless transmission, a mobile phone, and/or any of these in combination.

Output module 14, may include a coin-out center, a cash-out center and/or a receipt center. Output module 14 is arranged to provide and receive information during a transaction. Output module 14 may provide instructions to the purchaser or provide feedback from input received through Input module 12. For example, the identification and recorded price of scanned items may be displayed to the customer on display 20. In the case of a touch screen display, purchasers may also input information making the display serve as both a part of the input module 12 and output module 14. A speaker (not shown) may also serve to provide information to consumers. Other examples of output module 14 may include a private printing page, a link transmitting to a handheld device such as a mobile phone or tablet computer or the like.

Transaction module 16 may include centers accommodated by housing 11 where parts of the transaction occur, such as the bagger 16 and potentially an auxiliary bagger. Transaction module 16 may also include, by way of example, weigh centers, bumper guards or transaction shelving centers.

The kiosk may further include, a controller (not shown), operatively connected to the input module 12 and output module 14. The controller has programming arranged to process information from the input module 12, such as the items being purchased in the transaction, and to provide information through output module 14 to the customer to allow completion of a customer transaction through system 10.

A controller, such as a microprocessor, may be in the kiosk or store database computer, and usually includes an associated memory. The controller includes input/output ports in order to receive information from and to provide information to the modules included in the kiosk. By way of example, the controller receives information from the input module 12 and provides data to the output module 14. The controller may have a clock component so that elapsed time between events can be determined. Other configurations of times can be used.

The computer system may include a main memory or a secondary memory, or both, that may communicate with the controller. The main memory is generally a random access memory (RAM) that may include an item buffer for temporarily holding identification information corresponding to scanned items before the items are verified by the kiosk. On the other hand, the secondary memory with standard input/output ports may include any storage medium such as but not limited to a hard disk drive, a SCSI drive, a removable storage drive or removable storage units and interface. Alternatively, the secondary memory may include handheld computing devices, as well as, one or more databases such as a look-up database that includes SKU number, price, item codes, tolerance range for the item or for a class of items, and corresponding weight, height, length, or width for each item in the store. This database may reside on one or more of different or additional computers such as at a central store server or a remote server outside of the location.

Additionally, it is contemplated that the kiosk may not include a main memory. In this situation, the controller may communicate with the secondary memory which may be a remote server, for example, accessed via local area network or global networking such as the Internet or Intranet, and refresh a display screen with information and software stored in the remote server.

Currently, unattended self-checkout systems are designed for the novice or new user to step consumers through a sequence of actions that are required to complete a transaction successfully. These steps, by way of example, may include, but are not limited to, invoking an initial transaction state, scanning items, invoking a checkout state, choosing a form of tender, and scanning a prepaid card or swiping a credit card. Almost all steps above may be required in order for the consumer to complete a simple transaction even if the purchase is of a single item. Between each of these consumer actions, the system provides instructions for completing each step, which compounds the duration and complexity of the transaction.

Unattended vending self-checkout systems may reside in employee break rooms where staggered lunch shifts and work breaks cause several massive influxes of consumers at specific times throughout each work day. These influxes cause lines to form at the kiosks. It is not unusual for many of the consumers to have prepaid cards with stored value that is decremented with each purchase, and which the consumer may increment at their choosing using cash or credit at the kiosk.

Applicant realized, that especially in unattended vending environments, consumers typically purchase either only one or two items per transaction. Current kiosk systems require up to five discrete consumer actions to purchase a single item. During the course of a single lunch shift, the accumulation of the four or five discrete actions per transaction causes a number of undesirable things to occur, including: 1) Long checkout lines form and move slowly, even when the majority of consumers are buying only one or two items; 2) Kiosk touch screens receive maximum use, which leads to significant wear and tear, more frequent servicing and replacement, a higher cost of ownership, and ultimately a non-optimal scenario in terms of the system's environmental impact, and; 3) Germs are transferred between and among consumers via the touch screen just before eating, which is a particularly inopportune time.

The unattended vending kiosk is a relatively new system, and the methods comprising its interactive design have been modeled on related consumer-facing transaction systems that have preceded it, such as conventional self-checkout lanes in grocery retail environments. In an effort to improve adoption rates, conventional self-checkout systems have been deliberately designed to mirror the discrete interactions that have long existed between consumers and cashiers in traditional checkout environments.

While the trend in the art is to provide discrete interaction points for self-checkouts, their residual presence in newer self-checkouts and unattended vending kiosk systems, Applicant believes, may surprisingly be cumbersome and a burden to a large subset of current self-checkout, and especially, kiosk users.

Figure 2A:
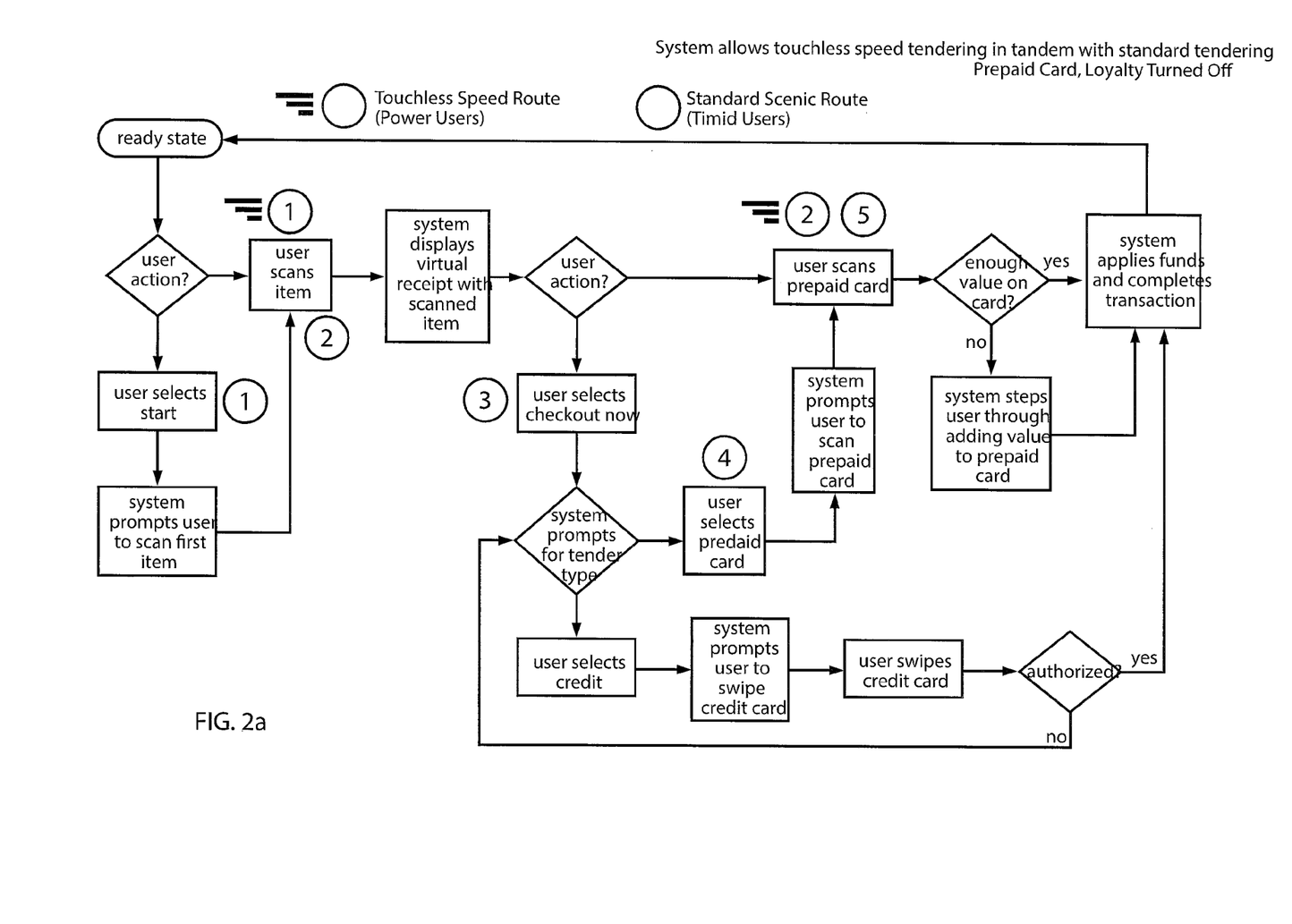
FIG. 2a is a flow chart illustrating one example of a self-checkout transaction with a speed tendering option with prepaid card payment.
Figure 2B:
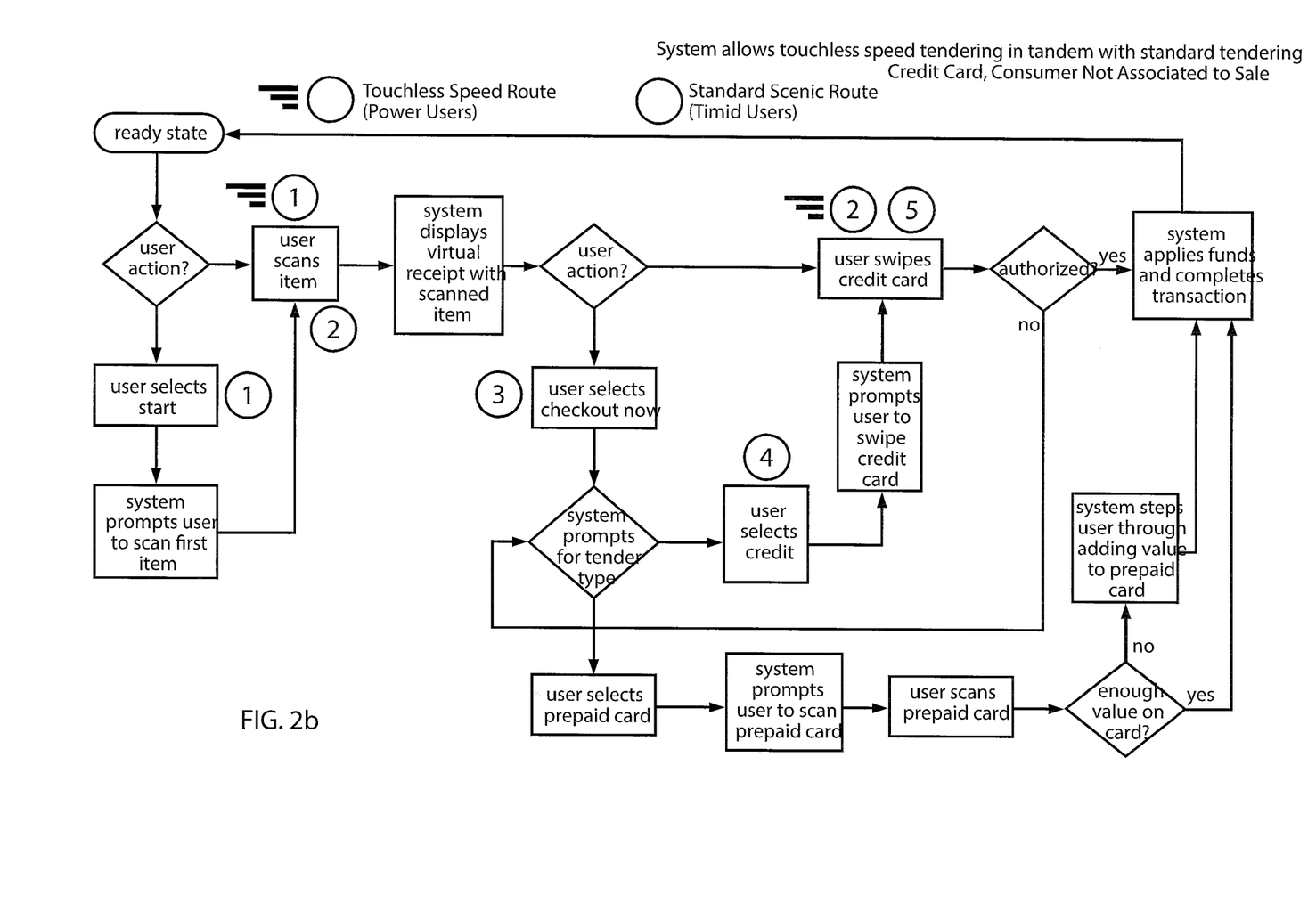
FIG. 2b is a flow chart illustrating one example of a self-checkout transaction with a speed tendering option with credit card payment.
Figure 2C:
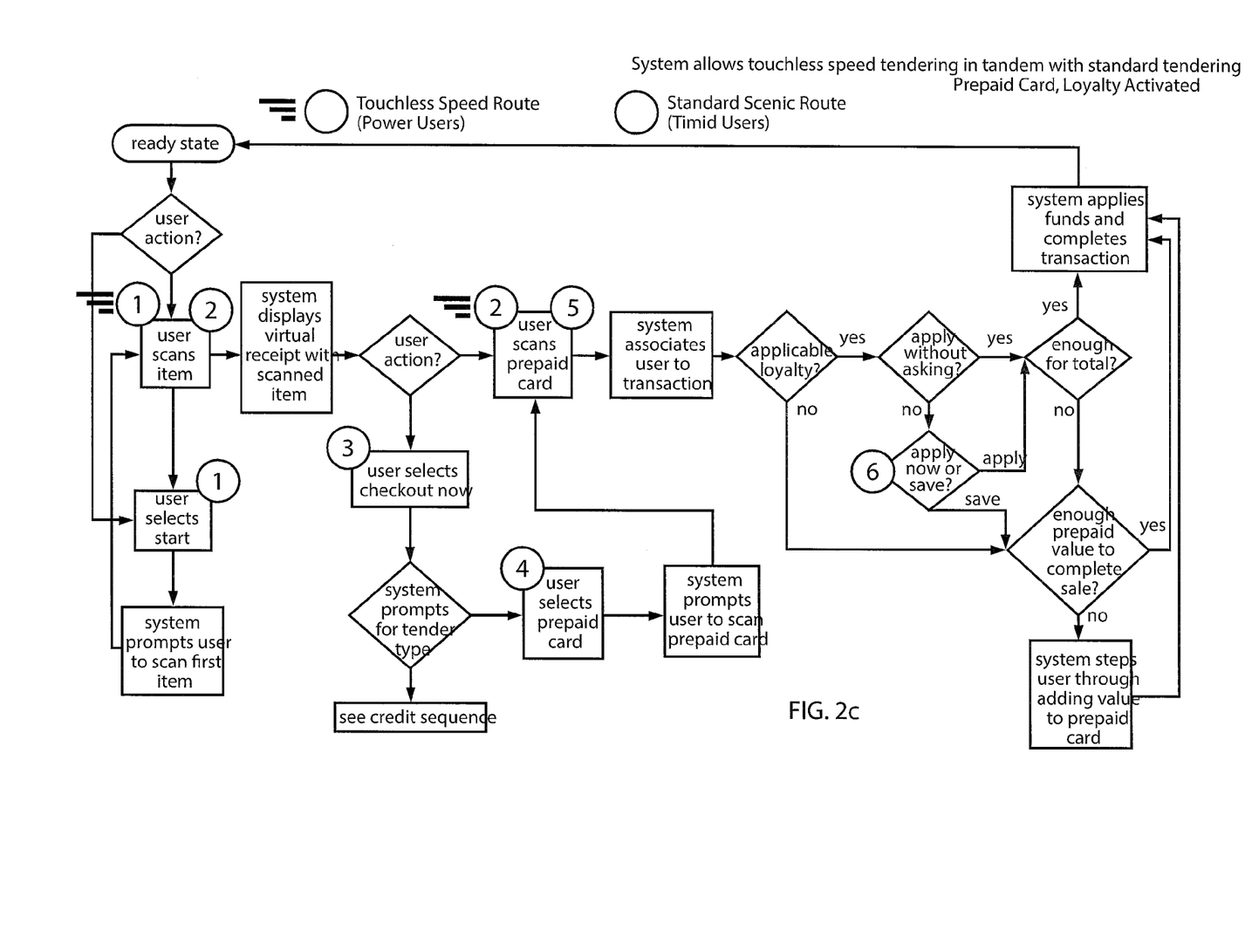
FIG. 2c is a flow chart illustrating one example of a self-checkout transaction with a speed tendering option with a prepaid payment while loyalty points are active.
Figure 3:
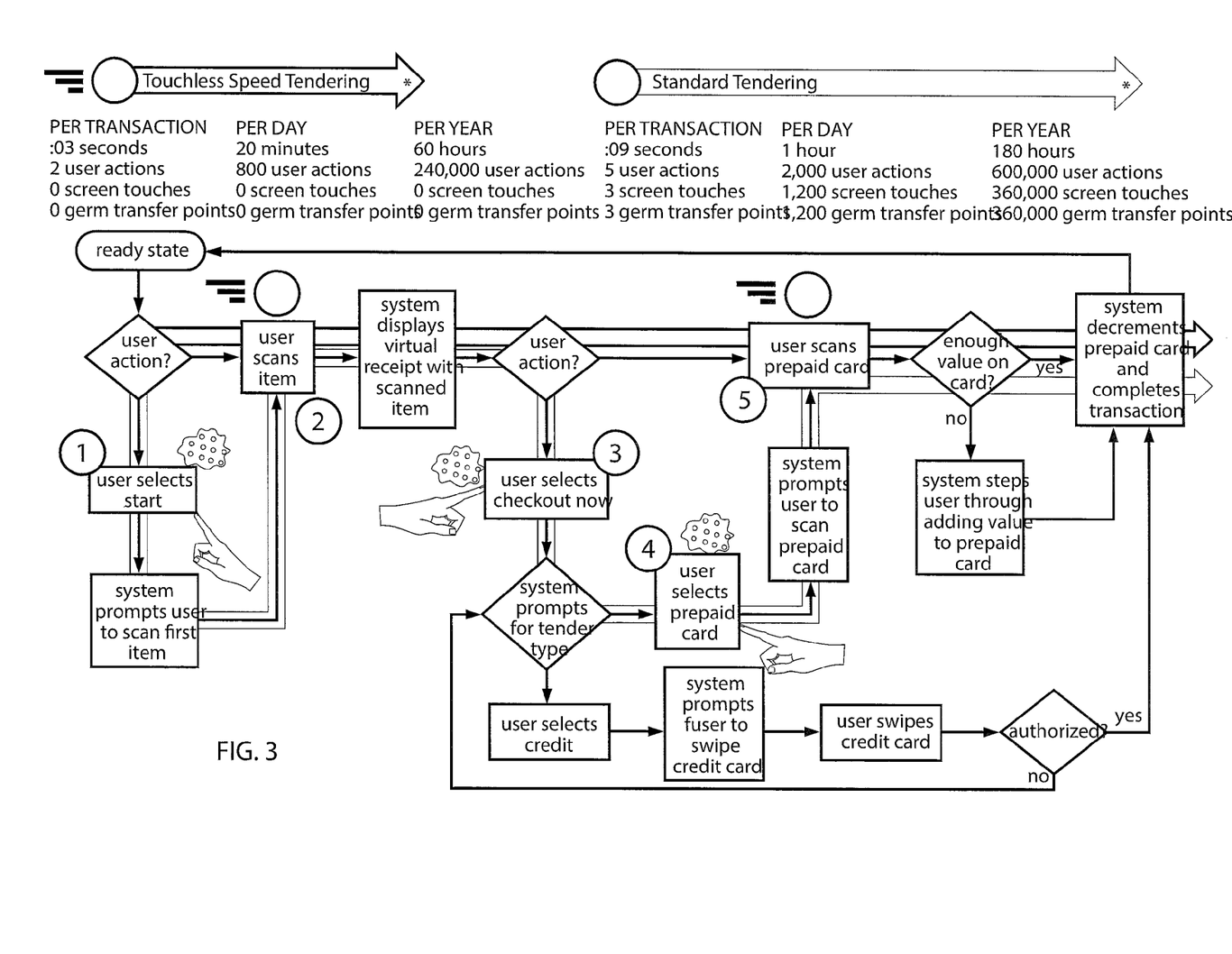
FIG. 3 is a flow chart illustrating one example of a self-checkout transaction with a speed tendering option illustrating certain variables as compared to variables associated with a standard tendering transaction.

The new system and method disclosed is adapted to allow a touch-less speed tendering option for completing a transaction at a self-checkout or vending self-checkout kiosk (shown in FIG. 2a-3 as touchless speed tendering). The checkout process may be expedited, especially at a vending kiosk, by reducing the number of discrete actions required to purchase an item. Modifications to certain peripheral devices, such as the bar code scanner and the magnetic credit card swipe, allow progression of an expedited transaction. The system of the invention has been modified so that such devices detect and perform actions based upon consumer actions made directly with these devices, such as scanning a prepaid card or swiping a credit card. Prior to the invention, consumers were required to press buttons on the touch screen to tell the system what they wanted to do next, such as "checkout now," "pay with prepaid card," or "pay with credit card." Therefore, previously the system could only perform in a specific mode that made it capable only of processing a subsequent consumer action that corresponded to that mode. When this mode was invoked, the system instructed the consumer to perform the action they had just indicated they were about to perform. It was a mode driven application through a consumer transaction, whereas Applicant's invention allows an interactive transaction based upon the consumer input.

By modifying the manner in which the devices, such as the scanner and/or the magnetic stripe reader detect input, interpret that input based on configurable conditions, and perform subsequent processes that combine formerly multiple interaction steps into a single step, Applicant has invented a system and method by which touch-less speed tendering may be implemented.

In one embodiment, the invention may work with two tenders: prepaid cards and credit cards. However, the invention encompasses embodiments that are effective with all other forms of tendering and/or the devices and technologies used to enable those tenders. One example might include, but should not be limited to, biometric authentication for prepaid accounts, charge accounts, credit/debit payments, and EBT/WIC. Near-field communication technology could also be used and is to be considered within the scope of this invention. While near-field technologies have been used with vending machines where the machine itself disperses the product and therefore has data about that product, it is novel to use such technology in connection with a system in which the customer undertakes a step (such as scanning a bar code) to tell the machine what product is being purchased.

Many self-checkouts allow for the use of loyalty points, an option often popular with consumers, especially in a vending scenario. Applicant experienced difficulty implementing the speed tendering option on kiosks honoring loyalty points because when the vending kiosk was modified to include the option of a loyalty points system, the loyalty and speed tendering would not work in tandem with one another. The speed tendering would only work if the loyalty was not activated because the loyalty points setting usually gives the user the choice to either 1) apply available loyalty points or 2) save loyalty points for later use, an option which contrasted with the speed tendering design. However, to address this limitation, Applicant further modified the system and methods to provide consumers with an account console where they have the option to change preferences at any time. In one embodiment, for example, consumers may have an option to "always apply available loyalty points without asking" to the consumer's account console preferences. Therefore, the invention could by-pass applying the limitation of "applying-now-or-saving-for-later," thereby enabling the touch-less speed tender option even in conjunction with loyalty point scenarios.

In another embodiment, the consumer preferences may be configurable so that touch-less speed tendering enables an "opt out of printed receipt" option. In this embodiment, the consumer triggering touch-less speed tendering tells the system not to ask the consumer if they would like a receipt at the end of the transaction, and again avoids the need to touch the screen or await a longer transaction.

In an effort to accommodate the technical competency deviations that exist across consumers with regard to conducting vending and self-checkout kiosk transactions, the touch-less speed tendering is designed to work in tandem with the more traditional self-checkout that involves multiple discrete interactions as described above. By embodying both methods in the same system, consumers are able to use the system that best suits their comfort level and mental model of the system. More timid users can learn from confident user over time by watching them use the touch-less speed tendering option, and convert over to using it when they are ready to direct a transaction in that manner.

In operation, and as illustrated in FIG. 2a-c, new, less confident users may progress through a transaction, by way of example, by selecting a button or an option on the welcome screen, such as to "start" or to "start scanning." The system may then display a ready screen and/or prompts the user to scan the first item. The user scans an item and a virtual receipt may be displayed. The user may be prompted to scan another item or to checkout. If the user selects the "checkout now" button, then the user is prompted to select their method of payment, typically a prepaid card 2a, credit card 2b, and/or prepaid card with loyalty functions activated 2c. If the user selects the prepaid card, then the system prompts the user to scan the prepaid card. Once the card is scanned, the system decrements the prepaid card balance and the transaction ends.

In contrast, a power user approaches the welcome screen and scans the item for purchase. The user then scans, for example, a prepaid card, the system decrements the prepaid card balance and the transaction is completed. The user is not required to touch the screen or respond to the incremental modes usually required for self-checkout. The user's actions interact with the system to determine a standard checkout scenario or a speed tender transaction. Several power users may be able to complete transactions in the time it takes one user to complete the standard mode directed transaction. And, the power user never has to touch any part of the kiosk. She/he passes the product near the bar code reader without touching it and touches only his/her payment card as it is read by a scanner or other reading device. That user, then that may have just bought a snack, can move quickly through the transaction and can also eat it without fear of infection of germs from the checkout transaction.

FIG. 3 illustrates the time savings per transaction and how that time savings expand over time to provide a true business and consumer benefit from the optional touchless speed tender system. Time per transaction is more than doubled by standard tendering versus touchless speed tendering, resulting in around 60 hours of transaction time involved with touchless tenders versus 180 hours of transaction time with standard keyed kiosk tender transactions. Users are required to maneuver through less steps and average 0 screen touches with touchless speed tender as compared to an average of 3 screen touches per transaction. In a year's time, that equates to 0 screen touches with speed tender as compared to 360,000 screen touches with standard tendering. The screen touch impact over time versus standard tender transactions and the germ transfer impact with touch-less speed tendering as compared to standard tendering is staggering and provides clear benefits to Applicant's touchless speed tender in addition to the decrease in transaction time.

In one embodiment, a checkout apparatus includes a self-checkout unit having a product identification device, a payment identification device, a microprocessor and memory operatively associated with one another to identify products being purchased, payments tendered therefor and to store transaction information locally or remotely. The microprocessor has programming configured to allow a user to enter an item in a product identification device, and to enter a payment token in the payment identification device and thereby complete the transaction from the customer's point of view. By way of example, the product identification device and/or the payment identification device may be a scanner, card reader, voice command enabled device and/or gestural command enabled device.

The product identification device and the payment identification device are each configured so the customer can present, for example, scan the product to be purchased and payment token and complete the transaction from the customer's point of view without ever touching the checkout apparatus. The programming also provides prompts to a user to allow touch-screen interaction with the self-checkout to indicate that the user wants to checkout and pay for a purchase, to provide guidance to the user to enter an item in the product identification device, and allow the user to touch an input device of the checkout apparatus to indicate if a selected plurality of purchases has already been entered in the product identification device and to enter a payment token in the payment identification device.

In another embodiment, a self-checkout kiosk includes a self-checkout station having a housing and a customer interface. The customer interface may include a product identification device. The kiosk includes a point-of-sale system having a microprocessor and memory operatively associated with one another to identify products being purchased, payments tendered therefor and to store transaction information locally at the checkout station or remotely from the checkout station. The point-of-sale system may include programming configured to allow completion of a touchless customer route transaction. The point-of-sale system may also include a standard, for example by touch-screen, customer route transaction option. The point-of-sale system may be configured so that customer activation of a peripheral device triggers the system to enter the touchless customer route transaction. Peripheral devices may include, by way of example, a scanner or other various input devices as previously discussed.

The self-checkout station may also include a detection module for detecting a customer's actions. The detection module senses a customer's touchless or standard touch input through the peripheral devices such as a scanner or push buttons. If a touchless transaction is detected then the station enters a customer-driven mode where the transaction is responsive and guided by the customer's actions and input throughout an expedited touchless transaction. If a touch transaction is detected, then the check-out process proceeds in a mode-driven transaction where the self-checkout station enters a mode and the consumer is asked to respond accordingly to the transaction mode.

Also disclosed is a method of allowing an expedited transaction option including providing a self-checkout unit having a product identification device, a payment identification device, a microprocessor and a memory operatively associated with one another to identify products being purchased and payment tendered therefore; allowing a customer to choose an expedited self-checkout transaction; recognizing a customer's choice for an expedited self-checkout; and skipping a mode-driven transaction when a customer chooses an expedited self-checkout. Also include may be accepting a customer payment by recognizing a payment token placed near the self-checkout kiosk to allow the kiosk to identify a payment option represented by the token, and thereby completing the transaction from the customer's point of view, without the customer touching the self-checkout kiosk. A standard touch-screen customer route transaction option may be offered optionally.

The invention may also be considered a method of making a consumer-driven sale to a customer including providing an inventory of different items marked with an identification code so that the differences in the items are represented in differing identification codes; reading the identification code when one of the items marked with an identification code is presented near a self-checkout kiosk to identify the item; and reading a payment token when it is presented near the self-checkout kiosk to allow the kiosk to identify a payment option to pay for the item read in the previous step. The payment option may be indicated by the token, without the customer touching the self-checkout kiosk.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A self-checkout kiosk comprising:
   a self-checkout station having a housing a customer interface, and at least one peripheral device associated with the customer interface,
   a point-of-sale system having a microprocessor and memory operatively associated with one another to identify products being purchased, payments tendered therefor and to store transaction information locally at the checkout station or remotely from the checkout station,
   the point-of-sale system having a touchless speed tendering programming configured to allow completion of a touchless self-checkout transaction at the kiosk, and
   a detection module communicatively coupled with the touchless speed tendering programming and the at least one peripheral device, the detection module configured to modify the at least one peripheral device to detect and perform actions based upon an initial customer action made directly and touchlessly with the at least one peripheral device to begin the touchless self-checkout transaction,
   wherein the touchless speed tendering programming is configured to:
      based upon the initial customer action recognized at the at least one peripheral device, initiate the touchless self-checkout transaction,
      avoid an incremental mode transaction,
      bypass limitations requiring a customer selection in order to progress through the transaction at the self-checkout kiosk;
      allow the customer to pay touchlessly and to complete the touchless self-checkout transaction without touching the kiosk.

2. The kiosk of claim 1 wherein the detection module is responsive and guided by the customer's actions throughout an expedited touchless transaction.

3. The kiosk of claim 1 wherein the transaction proceeds based upon consumer input.

4. The kiosk of claim 2 further including a console preferences module.

5. The kiosk of claim 1 wherein the point-of-sale system includes a standard touch-screen customer route transaction option.

6. The kiosk of claim 1 wherein the customer interface includes a product identification device.

7. The kiosk of claim 6 wherein the product identification device is a scanner.

8. The kiosk of claim 6 including a payment identification device.

9. The kiosk of claim 8 wherein the payment identification device is a scanner.

10. The kiosk of claim 1 wherein the point-of-sale system is configured so that customer activation of a peripheral device triggers the system to enter the touchless self-checkout transaction.

11. The kiosk of claim 4 wherein the customer's actions include scanning a customer loyalty card.

\* \* \* \* \*

UNITED STATES PATENT AND TRADEMARK OFFICE
CERTIFICATE OF CORRECTION

PATENT NO. : 9,563,886 B1  
APPLICATION NO. : 13/869727  
DATED : February 7, 2017  
INVENTOR(S) : Catoe et al.

Page 1 of 1

It is certified that error appears in the above-identified patent and that said Letters Patent is hereby corrected as shown below:

In the Claims

In Column 8, Line 31 (Claim 1) there should be a "," after the word --housing--

Signed and Sealed this
Eleventh Day of April, 2017

Michelle K. Lee
*Director of the United States Patent and Trademark Office*